March 28, 1967 J. H. SCHRADER 3,311,832

MULTIPLE INPUT RADIO RECEIVER

Filed March 29, 1963 2 Sheets-Sheet 1

INVENTOR
JAMES H. SCHRADER

BY

G. W. O'Brien
William H. King
ATTORNEYS

INVENTOR
JAMES H. SCHRADER

BY G. D. O'Brien
William H. King
ATTORNEYS

United States Patent Office 3,311,832
Patented Mar. 28, 1967

3,311,832
MULTIPLE INPUT RADIO RECEIVER

James H. Schrader, Newport News, Va., assignor to the United States of America as represented by the Administrator of the National Aeronautics and Space Administration Filed Mar. 29, 1963, Ser. No. 269,212
10 Claims. (Cl. 325—305)

Figure 1:
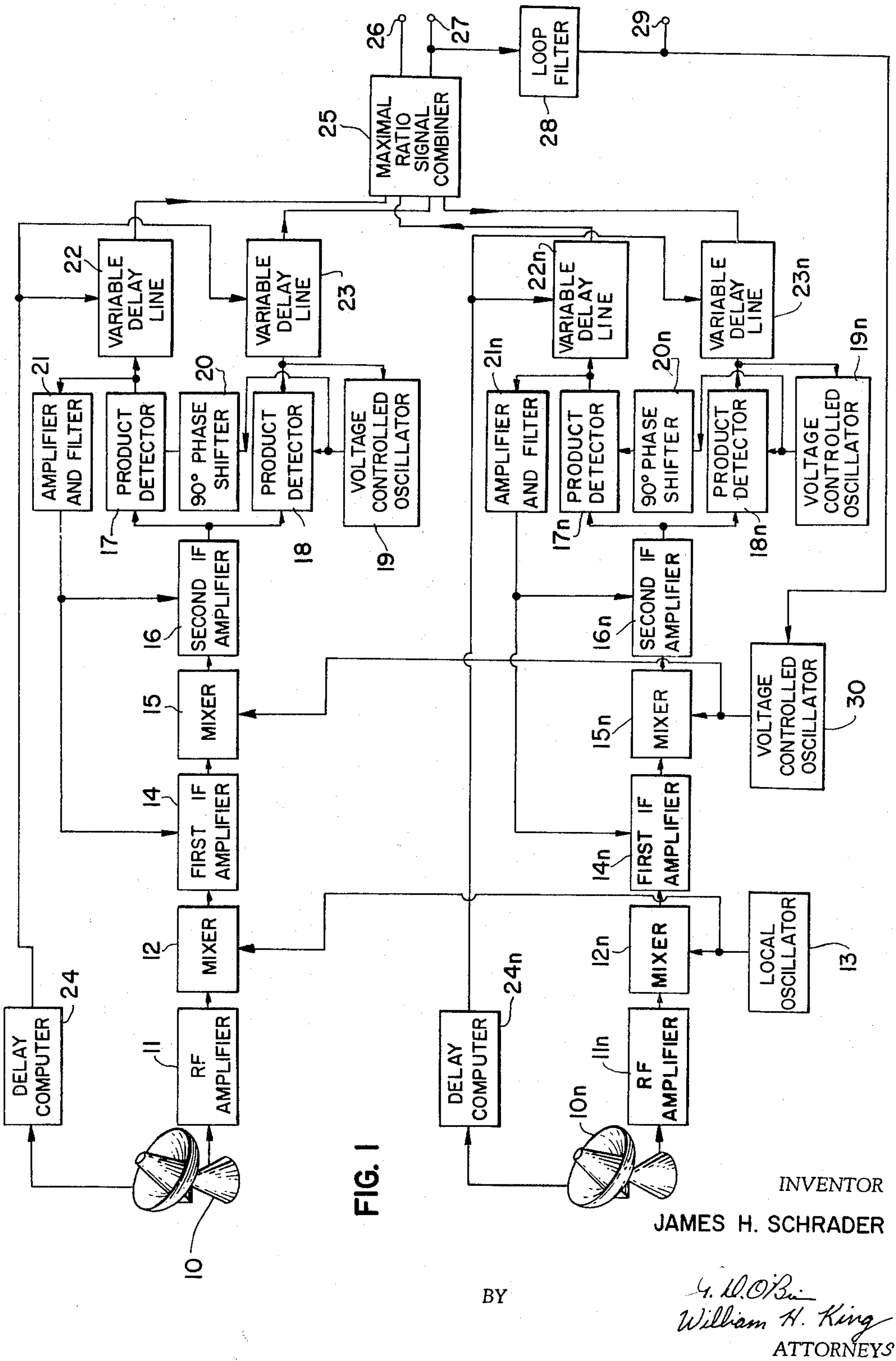

The invention described herein may be manufactured and used by or for the Government of the United States of America for governmental purposes without the payment of any royalties thereon or therefor.

The invention relates generally to a radio receiver and more specifically to a radio receiver which operates from a plurality of independently steerable anntennas for deep space communications.

As space probes are sent farther and farther into space, it will be necessary that the receiving apertures of receiving equipment on ground be increased in order to communicate with these space probes. At present, the commonly used method of obtaining a large receiving aperture is to construct very large rigid reflectors which focus the intercepted energy at a single point where it is collected. There are two primary disadvantages to this method which become apparent as the size of the reflector becomes very large (100–200 feet in diameter). These are: first, the tolerance to which the reflecting surface must be maintained becomes infeasible, and second, the beam width of the antenna becomes so small that tracking the antenna becomes a major problem.

The present invention is an economical ground based radio receiver which when used with an array of independent antennas can be made to have an extremely large effective antenna aperture for communicating with deep space probes. The receiver operates from an array of independently steerable antennas and is capable of performing to the same threshold as a phase lock receiver operating from a single antenna with an effective aperture equal to the sum of the effective apertures in the array. The receiver will detect the average amplitude, phase and frequency of the RF signals received on all the antennas in the array.

The difficulty in designing a receiver to operate from independently steerable antennas is due to the fact that the angular modulation appearing on each individual input is different. The modulation seen on the received signals can be grouped into two categories. The first category is that portion of the modulation which is common to all inputs. This includes the intentional and incidental modulation created at the transmitter plus the average Doppler shift or the Doppler shift seen at the array center. The second category is that portion of the modulation which is peculiar to each individual input. This includes the individual Doppler shift relative to the average Doppler shift, wave front distortion caused by the atmosphere, and delays introduced by amplifiers and cables. The receiver which constitutes this invention includes one primary phase lock loop for the detection of the angular modulation which is common to all inputs and a number of secondary phase lock loops for the detection of the modulation which is peculiar to each individual input.

It is therefore an object of this invention to provide a receiver which can be used with an array of independently steerable antennas to provide a receiving system with an extremely large effective receiving aperture.

Another object of this invention is to provide a receiver which is capable of utilizing all the signal power received on a number of antennas from the same source without requiring that the signals be phase coherent.

A further object of this invention is to provide a receiver which will operate from an array of independently steerable antennas and which includes one primary phase lock loop for the detection of the angular modulation that is common to all inputs and a number of secondary phase lock loops for the detection of the modulation that is peculiar to each individual input.

Figure 2:
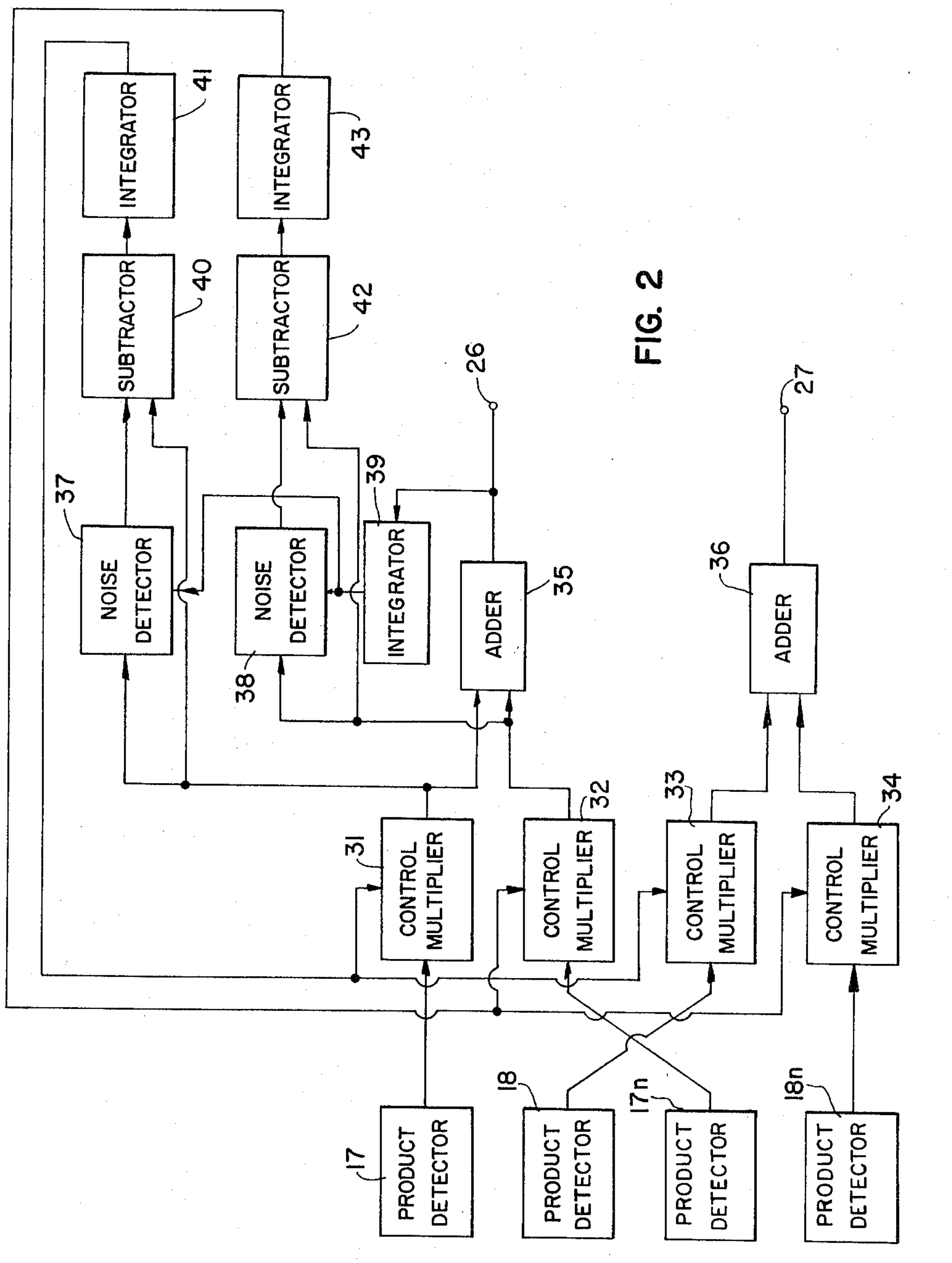

Other objects and a fuller understanding of this invention may be had by referring to the following specification and the accompanying drawings in which:

FIG. 1 shows a block diagram of a two-channel receiver which constitutes this invention; and FIG. 2 shows a block diagram of a maximal ratio signal combiner which can be used with the recevier shown in FIG. 1.

The invention consists essentially of a multiple input radio receiver (each input is applied to a separate input channel) with each of its inputs fed by an independently steerable antenna. The receiver includes one primary phase lock loop for the detection of the angular modulation which is common to all inputs. The receiver also includes a number of secondary phase lock loops, equal to the number of separate antennas used, for the detection of the modulation which is peculiar to each input. In the secondary phase lock loops of the receiver, the amplitude and phase of the individual inputs are detected. Then these detected amplitiudes and phases are summed in an optimum manner to produce the average detected amplitude and phase of all incoming signals. The average detected phase is then integrated and applied to a voltage controlled oscillator in the primary phase lock loop to cause it to track the average incoming phase.

Referring now to FIG. 1 there is shown a two-channel radio receiver incorporating this invention. However, it should be realized that any number of channels could be used with this receiver to accommodate a like number of antennas. The two channels shown by FIG. 1 operate exactly the same; therefore, only the upper channel will be described. The blocks in the lower channel are represented by the same numbers as the numbers representing the corresponding blocks in the upper channel except the suffix $n$ appears with each number.

Antennas 10 and 10$n$ are independently steered to track an object from which an RF signal is to be received. Means for steering antennas to track objects are well known and will, therefore, not be disclosed in this specification. Any RF signal intercepted by antenna 10 is applied to an RF amplifier 11 and then to a mixer 12. Also applied to mixer 12 to produce any convenient first IF fraquency is a signal produced by a local oscillator 13. It is necessary that the signal generated by local oscillator 13 be applied to mixer 12 in all channels to maintain frequency coherence. The first IF frequency is amplified by a first IF amplifier 14 and then applied to a mixer 15. Also applied to mixer 15 to produce a second IF frequency is a signal generated by a voltage controlled oscillator 30. The relative phase of the signal generated by oscillator 30 is the average of the phases of the signals intercepted by all antennas. This relative phase of oscillator 30 is maintained by a feedback signal which will be discussed later.

The signal intercepted by antenna 10 will have certain angular modulations which are present in all incoming signals. These include the intentional and incidental modulation created at the transmitter and the average Doppler shift or the Doppler shift seen at the array center. Since the signal generated by voltage controlled oscillator 30 has a relative phase equal to the average of the phases of all incoming signals it also will have the modulation which is present in all incoming signals. Therefore, the signal from oscillator 30 will subtract all of this angular modulation from the signal intercepted by antenna 10.

Extremely small angular deviations (individual Doppler shift relative to average Doppler shift, wave front distortion caused by the atmosphere, and different phase shifts caused by amplifiers and cables) which are different for each incoming signal will still remain with the signal at the output of mixer 15.

The output of mixer 15 is amplified by a second IF amplifier 16 and then applied to a product detector 17 and to a product detector 18. Also applied to product detector 18 to produce a detected phase signal is a signal generated by a voltage controlled oscillator 19. The detected phase signal is applied to oscillator 19 to lock it in phase with the signal applied to product detector 18. The signal generated by voltage controlled oscillator 19 in addition to being applied to product detector 18, is shifted in phase by a 90° phase shifter 20 and then applied to product detector 17 to produce a detected amplitude signal. This detected amplitude signal is applied through an AGC amplifier and filter 21 to amplifiers 14 and 16 to control their gains.

In the phase lock servo, which includes voltage controlled oscillator 19 and product detector 18, it is possible to use extremely narrow servo bandwidths (on the order of .01 c.p.s. to 1.0 c.p.s. depending on the angular velocity of the source) resulting in linear signal detection to relatively high noise-to-signal ratios. The servo bandwidth of this phase lock loop does not affect the information or video bandwidth of the receiver in that the IF amplifiers 14 and 16, and product detector 18 can be made broadband to accommodate relatively high frequency error signals for the phase lock servo which includes voltage controlled oscillator 30.

If the distance between antennas is appreciable (.1 wavelength or greater of the highest modulation frequency to be received) it is necessary to use two variable delay lines 22 and 23 to assure phase coherence of all incoming signals. These two delay lines are controlled by a delay computer 24. Delay computer 24 receives input angular coordinates from antenna 10 and computes from these angular coordinates the delay necessary to make the signals produced by product detectors 17 and 18 phase coherent with the signals produced by the product detectors in all other channels.

The outputs from variable delay lines 22 for all input channels are summed by a maximal ratio signal combiner 25 to produce an average detected amplitude modulation signal at an output terminal 26; and the outputs from variable delay lines 23 for all input channels are summed by maximal ratio signal combiner 25 to produce an average detected phase modulation signal at an output terminal 27. The maximal ratio signal combiner 25 contains circuitry for changing the amplitudes of the signals applied to it so that the amplitudes of these signals are proportional to their signal-to-noise ratios. After the amplitudes of the signals have been changed, they are then summed. A maximal ratio signal combiner suitable for use as a maximal ratio signal combiner 25 is disclosed by FIG. 2.

The signal at output terminal 27 is applied to a loop filter 28 to integrate it and produce, at an output terminal 29, an average detected frequency modulated signal for all channels. The signal at output terminal 29 is applied to voltage controlled oscillator 30 to modulate the signal produced by it.

Referring now to FIG. 2 there is shown a block diagram of a maximal ratio signal combiner which is suitable for use as maximal ratio signal combiner 25. This block diagram also shows product detectors 17, 18, 17*n*, and 18*n*. Variable delay lines 22, 23, 22*n*, and 23*n* are not shown connected between the product detectors and the maximal ratio signal combiner. The outputs from product detectors 17, 17*n*, 18, and 18*n* are applied to control multipliers 31, 32, 33, and 34, respectively. The outputs from control multipliers 31 and 32 are summed by an adder 35 to produce a signal at output terminal 26; and the outputs from control multipliers 33 and 34 are summed by an adder 36 to produce a signal at output terminal 27. Adders 35 and 36 each produce an output signal whose amplitude is equal to the average of the amplitudes of the input signals applied to it.

The outputs from control multipliers 31 and 32 are applied to noise detectors 37 and 38, respectively. These noise detectors detect a portion of noise spectrum out of each channel and produce a D.C. signal proportional to the square of the noise. The output of adder 35 is integrated by an integrator 39 and then applied to noise detectors 37 and 38 to control their gain. The outputs from noise detector 37 and control multiplier 31 are applied to a subtractor 40 which produces a signal proportional to their difference. This difference signal is integrated by an integrator 41 and then applied to control multipliers 31 and 33 to control the gain of these multipliers. The outputs from noise detector 38 and control multiplier 32 are applied to a subtractor 42 which produces a signal proportional to their difference. This difference signal is integrated by an integrator 41 and then applied to control multipliers 32 and 34 to control the gain of these multipliers. With this arrangement the signal-to-noise ratios at output terminals 26 and 27 are made to equal the sum of the signal-to-noise ratios of all the inputs to the receiver.

It will be apparent to those skilled in the art that the novel principles of the invention disclosed herein in connection with the specific exemplification thereof will suggest various other modifications and applications of the same. For example, other maximal ratio signal combiners could be used. It is accordingly desired that in construing the breadth of the appended claims they shall not be limited to the specific exemplifications of the invention described herein.

What is claimed is:

1. A multi-input receiver that operates from a plurality of independently steerable antennas comprising: a number of input channels equal to the number of antennas with each input channel connected to its respective antenna; a voltage controlled oscillator that produces a signal which has a relative phase equal to the average of the phases of the signals intercepted by all antennas; a mixer in each input channel connected to receive the signal generated by the voltage controlled oscillator and the signal intercepted by its respective antenna for producing a signal that has removed from it the angular modulation common in all signals intercepted by the antennas; means in each input channel connected to said mixer for removing from the output of the mixer the angular modulation peculiar to its respective channel and for detecting the amplitude and phase of the signal at the output of the mixer; means for separately summing the detected amplitudes and phases of all channels; and means for integrating the summed phases and for applying the integrated signal to the voltage controlled oscillator to cause the relative phase of the signal produced by the voltage controlled oscillator to be equal to the average of the phases of the signals intercepted by all antennas.

2. A multi-input receiver as claimed in claim 1 wherein said summing means is a maximal ratio signal combiner that changes the amplitudes of the signals applied to it proportional to their signal-to-noise ratios before they are summed.

3. A multi-input receiver as claimed in claim 1 wherein there is provided variable delay means in each input channel for delaying said detected amplitude and said detected phase in each channel in accordance with the angular coordinates of the antenna that feeds that input channel to assure phase coherence of all signals before they are summed.

4. A multi-input receiver that operates from a plurality of independently steerable antennas comprising: a number of input channels equal to the number of antennas with each input channel connected to its respective antenna;

a local oscillator; a first mixer for each input channel connected to receive the signal intercepted by its respective antenna and the signal generated by said local oscillator for producing a first IF frequency; a first IF amplifier for each input channel for amplifying said first IF frequency; a voltage controlled oscillator that produces a signal which has a relative phase equal to the average of the phases of the signals intercepted by all antennas; a second mixer in each input channel connected to receive the signal generated by the voltage controlled oscillator and the amplified first IF frequency for producing a second IF frequency that has removed from it the angular modulation present in all signals intercepted by the antennas; a second IF amplifier for amplifying said second IF frequency; means in each channel for removing from the second IF frequency the angular modulation peculiar to that channel and for detecting the amplitude and phase of the second IF frequency; means for separately summing the detected amplitudes and phases of all channels; and means for integrating the summed phases and for applying the integrated signal to the voltage controlled oscillator to cause the relative phase of the signal produced by the voltage controlled oscillator to be equal to the average of the phases of the signals intercepted by all antennas.

5. A multi-input receiver as claimed in claim 4 wherein there is a means in each input channel for applying said detected amplitude to said first and second IF amplifiers as an automatic gain control.

6. A multi-input receiver as claimed in claim 4 wherein said summing means is a maximal ratio signal combiner that changes the amplitudes of the signals applied to it proportional to their signal-to-noise ratios before they are summed.

7. A multi-input receiver as claimed in claim 4 wherein there is provided variable delay means in each input channel for delaying said detected amplitude and said detected phase in each channel in accordance with the angular coordinates of the antenna that feeds that input channel to assure phase coherence of all signals before they are summed.

8. In a multi-input receiver that operates from a plurality of independently steerable antennas, means for removing from the signals intercepted by all antennas the angular modulation that is common to all the intercepted signals; and means for removing from each intercepted signal the angular modulation that is peculiar to that signal.

9. In a multi-input receiver which operates from a plurality of independently steerable antennas and which has a number of input channels equal to the number of antennas with each input channel connected to its respective antenna, a voltage-controlled oscillator that produces a signal which has a relative phase equal to the average of the phases of the signals intercepted by all antennas; a mixer in each input channel connected to receive the signal generated by the voltage-controlled oscillator and the signal intercepted by its respective antenna for producing a signal that has removed from it the angular modulation common in all signal intercepted by the antennas; means in each input channel connected to said mixer for removing from the output of the mixer the modulation peculiar to its respective channel and for detecting the phase of the signal at the output of the mixer; means for summing the detected phases of all channels; and means for integrating the summed phases and for applying the integrated signal to the voltage-controlled oscillator to cause the relative phase of the signal produced by the voltage-controlled oscillator to be equal to the average of the phases of the signals intercepted by all antennas.

10. In a multi-input receiver as claimed in claim 9 wherein said summing means is a maximal ratio signal combiner that changes the amplitudes of the signals applied to it proportional to their signal-to-noise ratios before they are summed.

References Cited by the Examiner

UNITED STATES PATENTS

| | | | |
|---|---|---|---|
| 2,629,816 | 2/1953 | Rabuteau | 325—305 X |
| 2,975,275 | 3/1961 | Adams | 325—305 |
| 3,013,151 | 12/1961 | Adams et al. | 325—305 |

OTHER REFERENCES

Locke, R. V. Jr.: "Experimental Comparison of Equal-Gain and Maximal-Ratio Diversity Combiners," Proceedings of the IRE, August 1960, p. 1488.

KATHLEEN CLAFFY, *Primary Examiner.*

R. S. BELL, *Assistant Examiner.*